Dec. 3, 1940.   R. J. NEWTON   2,223,739
APPARATUS FOR EXTRACTING JUICES
Filed Sept. 29, 1937   2 Sheets-Sheet 1

Inventor
Robert J. Newton
By Lyon & Lyon
Attorneys

Dec. 3, 1940.　　　R. J. NEWTON　　　2,223,739
APPARATUS FOR EXTRACTING JUICES
Filed Sept. 29, 1937　　　2 Sheets-Sheet 2

Inventor
Robert J. Newton
By Lyon & Lyon
Attorneys

Patented Dec. 3, 1940

2,223,739

UNITED STATES PATENT OFFICE 2,223,739

APPARATUS FOR EXTRACTING JUICES

Robert J. Newton, Honolulu, Territory of Hawaii, assignor to California Packing Corporation, San Francisco, Calif., a corporation of New York Application September 29, 1937, Serial No. 166,331

1 Claim. (Cl. 146—175)

This invention relates to apparatus for use in extracting juices from various pulpy or fibrous fruits and vegetables, pineapple and citrus fruit being examples. The invention is particularly directed to methods and apparatus whereby a high recovery can be attained even though the method is carried out in a continuous manner.

Although the apparatus of this invention are adapted for various uses and purposes, they will be described specifically as they relate to the extraction of juice from pineapples. In the pineapple industry large quantities of wholesome but second grade fruit are produced and most of this fruit is used as a source of juice. In addition, the cores or central portions of fruit sliced for canning are also treated for the extraction of juice therefrom. These cores are extremely fibrous and it is difficult to extract any appreciable percentage of the juice therefrom.

Heretofore extractors of a centrifugal type have been used, such extractors including a rotating element or elements on a vertical shaft but it has been impossible to obtain a high extraction since an attempt to increase the extraction efficiency resulted in clogging or choking of the apparatus.

The present invention is based upon the discovery that in order to obtain efficient extraction it is necessary to shred the fruit so as to rupture and expose the cells and to maintain a back pressure within the apparatus so as to prevent undesired quantities of juice to be discharged with the fibrous residues, the back pressure insuring the discharge of the juice through the juice outlets, thereby facilitating the separation of the juice from the fibrous residue.

This discovery is utilized in the method of this invention and the apparatus is designed so as to maintain a desired back pressure during operation and to automatically release the fibrous material in the event the back pressure exceeds a predetermined amount, such automatic release permitting the process to be carried out in a continuous manner without choking or clogging the equipment.

It is an object of this invention, therefore, to disclose a continuous method of extracting juices from fibrous fruits.

Another object of the invention is to disclose a method of extracting juice from fibrous fruits and simultaneously separating the fibrous residue from the juice.

A further object is to provide a method of continuously operating centrifugal-type extractors, in which method a predetermined back pressure is maintained on the fibre discharged.

An object of the invention is to disclose an improved form of continuous extraction apparatus.

These and other objects, uses, advantages, modifications and adaptations of the invention will become apparent to those skilled in the art from the following detailed description of an illustrative form of the invention.

In the description, reference will be had to the appended drawings, in which.

Figure 1:
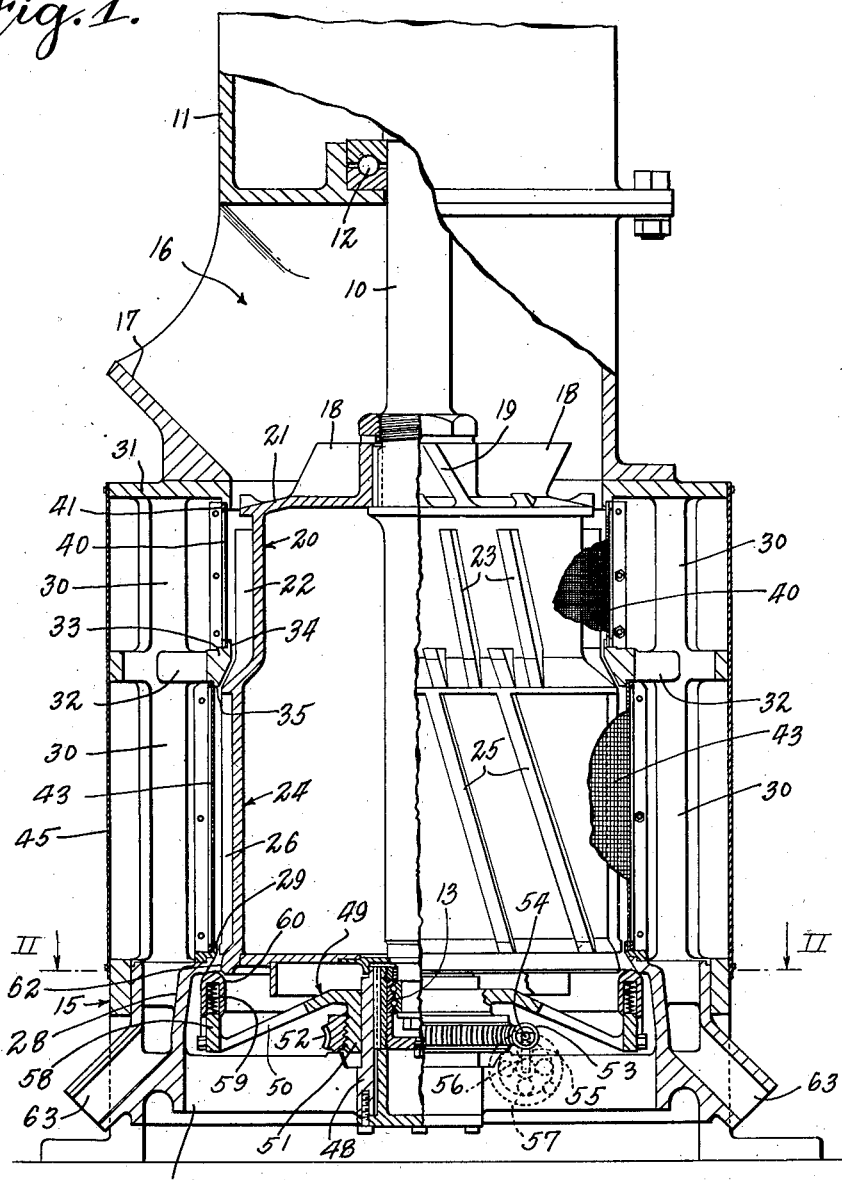
Fig. 1 is a side elevation, partly in vertical section, of an extraction apparatus made in accordance with this invention and for use therein.
Figure 2:
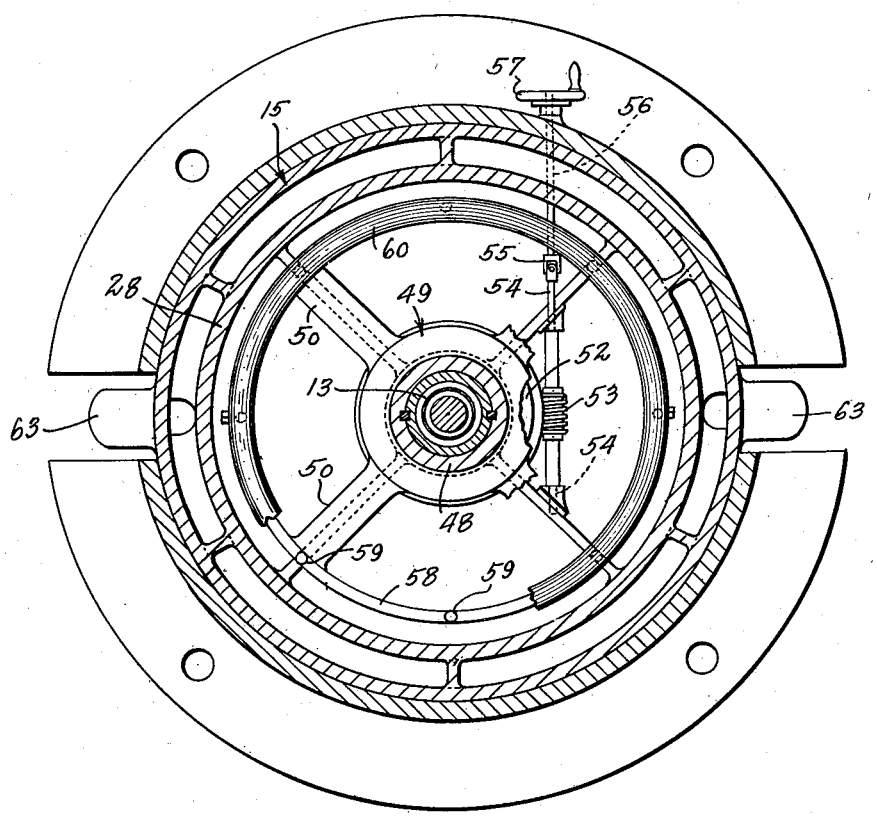
Fig. 2 is a horizontal section taken along the plane II—II of Fig. 1.

As shown in these drawings, the apparatus comprises a vertical shaft 10 provided with a driving means connected to the upper end of the shaft, such driving means being not shown. The shaft is journaled in the housing 11 of the device, an upper bearing being indicated at 12 and a lower bearing at 13. This lower bearing 13 is carried in a spider 14 formed in or attached to the base 15 of the apparatus. The upper portion of the apparatus includes a shredding chamber 16 provided with a feed chute or hopper 17, this feed chute or hopper being preferably tangentially directed into the shredding chamber 16. Mounted upon the shaft 10 in said shredding chamber 16 are knives or paddles 18, 19, etc., in one or more vertically spaced zones or layers, said knives being preferably inclined as shown, the upper edges being in advance of the lower edges in the direction of rotation of the shaft 10, thereby shredding and at the same time impelling the shredded material downwardly onto the head or top of an upper body member 20 attached to and rotating with the shaft 10. The body member 20 may be either cylindrical or in the form of an upwardly directed cone, although a cylindrical form is preferred and is shown herein. This body member 20 is provided with a conical upper surface 21 and carries on its substantially vertical outer surfaces a series of blades or ribs 22, 23, and the like, which are also forwardly inclined in the direction of rotation. These ribs may be about 0.5 to 0.8 inch deep.

Integral with or associated with the upper body portion 20 is a lower body portion 24 of larger perimeter or diameter than the upper body portion and also mounted on the shaft 10. This lower body portion 24 is provided with similar outstanding forwardly inclined ribs or blades 25, 26, and the like, of the same or shallower depth as the ribs 22. The base 15 is connected to the spider 14 and is provided with an inner wall or partition 28 having an inwardly extending lip 29 at its upper end, the inner face of the lip 29 being downwardly and outwardly inclined as shown. The outer wall of the base 15 is provided with suitable standards or ribs 30 attached to the top of the device as at the shoulder 31. The ribs 30 may carry a spider or inwardly extending arms 32 adapted to firmly hold a ring 33 having an upwardly directed lip 34 and a dependent lip 35. The inner face of the ring 33 is downwardly and outwardly inclined as indicated. A finely perforated screen or screens 40 held in suitable frames 41 are removably clamped in position around the upper body portion 20, the frames 41 preferably interlocking with the lip 34. A similar finely perforated frame 43 is removably held between the ring 33 and the lip portion 29. The entire body portion of the device is then enclosed by means of a removable housing 45.

The perforations in the screens 40 are preferably of the order of 0.02 to 0.03 inch. The perforations in the lower screens 43 are preferably about 0.01. In other words, the perforations in the lower screens are larger than those in the upper screen, although the conditions can be reversed if desired. The space between the edges of the blades 22 and the plane of the screens 40 may be about 0.2 inch and a similar or slightly smaller spacing may exist between the edges of the blades 26 and the screens 43.

It will be evident from the description given hereinabove that the apparatus includes the base 15 provided with the annular upwardly directed wall member 28 and a housing which comprises the upper portion adapted to form the shredding chamber 16 and have the feeding hopper 17 in communication therewith and a lower housing portion which is in effect a frame consisting of the upper shoulder 31, the frames or ribs 30, spider 32 and the ring 33. This housing frame is adapted to removably receive the screens 40 and 43, the entire lower portion of the housing being provided with a removable cover 45. The lip 29 may be integral with the base or with the upper frame of the housing.

The spider 14 may be provided with an axially positioned sleeve or cylinder 48 in which the bearing 13 is removably held. This cylinder 48 may carry a spider, generally indicated at 49 and provided with the arms 50, the spider 49 being slidable vertically along the cylinder 48 and suitably keyed thereto to prevent rotation. The spider 49 is provided with a boss 51 which is exteriorly threaded. A member 52 is threadedly engaged with the boss 51, the exterior of the member 52 being provided with a spiral gear adapted to engage with a worm 53 carried by a shaft 54 journaled in the spider 14, one end of the shaft 54 being provided with a toggle or universal joint 55 and an extension 56 carrying a hand wheel 57.

The ends of the movable spider 49 carry an upwardly directed ring 58 having a plurality of bores adapted to receive springs, as shown at 59. A U-shaped valve ring 60 is carried on the cylindrical ring 58 and covers the upper ends of the springs 59. The upper edge of the valve ring is preferably rounded or semi-circular and is adapted to seat against the lower edge of the lip 29 carried by the housing frame. When thus seated against the lower edge of the lip 29, the valve ring 60 should clear the lower edge of the cylindrical body portion 24 by about 1/64 inch (in the event the apparatus is to be used on pineapple), the upper portion of valve ring 60 virtually closing the gap between the inwardly and downwardly inclined face 62 of the body member 24 and the oppositely (downwardly and outwardly inclined) face of the lip 29.

In operation, therefore, the shaft 10, together with the shredding knives 18 and 19 and the body portions 20 and 24, is rotated and cores, pineapple or other fruit are fed to the upper portion of the housing and into the shredding chamber 16 through the feeding hopper 17. The shredded material is passed into the narrow annular space between the perforated screen 40 and the ribs or blades 22 of the body portion 20, downward feeding of the material being assisted by the action of the shredding knives 18 and 19 and the angulation of the blades 22 and 23. Further shredding and maceration of the mass takes place between the screen 40 and the body portion 20, juice being discharged through the perforations of the screen 40 into the annular space existing between the screen and the outer removable cover 45 of the apparatus. The partly expressed fibrous material then passes through the fixed gap existing between the frame ring 33 and the rotating body portion of the machine and is then further expressed by the action of the rotating body member 24 with its blades 25, 26, etc. against the larger perforations of the screen 43. Additional juice is discharged in this secondary zone through the perforations of the screen. A virtually dry pulp or fibre is forced downwardly by the action of the blades 25 and 26 into the gap existing between the oppositely inclined faces 29 and 62 and against the upper portion of the valve ring 60. The fibre thus discharged falls through the spider 14 into a suitable hopper from whence it may be removed either periodically or continuously as by means of a screw conveyor. The juice expressed through the perforations existing in the screens 40 and 43 passes downwardly into the annular space between the inner and outer walls 28 and 15 of the base from whence it is discharged by a suitable conduit as, for example, the conduit 63.

During the above-described operation and in the event the fibre content of the fruit being expressed is materially increased as, for example, by the introduction of cores alone instead of a mixture of cores and whole pineapple, a larger volume of fibre is fed downwardly through the annular passageways existing between the screens and the rotating body portions of the machine. This increased volume of fibre results in an increased back pressure at the discharge port between the faces 29 and 62. Such increased pressure depresses the valve ring 60 and permits these fibres to discharge without causing the fibres to plug up and choke the space adjacent the face of the screen 43. Furthermore, by actuating the hand wheel 57, the shaft 54 and the worm gear 53 may be rotated, rotation of such worm gear 53 resulting in a rotation of the member 52.

When the member 52 is rotated, the spider 49 may be caused to rise or fall, thereby either increasing or decreasing the pressure with which the valve ring 60 is held against the outwardly moving mass of fibre. It is to be remembered that this valve adjustment can take place during operation of the machine and it is not necessary to stop operations in order to make such adjustments.

I claim:

In a juice extractor, the combination of a housing frame including a cover, an internal bore with its axis in a vertical position and screen elements in the walls of said bore; a base with an enlarged bore therein; a driven substantially cylindrical body element in said first named bore, said body element being provided with inclined spaced parallel vanes on its cylindrical surface, said vanes being forwardly inclined in the direction of rotation of the body element, said body element being spaced from the frame to form a gap in communication with the base bore; an independent vertically movable, yieldable, ring-shaped back pressure valve member in said base and immediately below said gap; a plurality of spaced spring means for yieldably urging said valve member toward said gap; and means, extending exteriorly of said base and housing frame, for adjustably positioning said valve member vertically and adjusting the yielding pressure thereof.

ROBERT J. NEWTON.